(12) United States Patent
Taratorin (10) Patent No.: US 9,025,268 B1
(45) Date of Patent: May 5, 2015

(54) CROSS-TRACK INTERFERENCE TESTING OF A HARD DISK DRIVE (71) Applicant: HGST Netherlands B.V., Amsterdam (NL)

(72) Inventor: Alexander Taratorin, Sunnyvale, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 14/074,361

(22) Filed: Nov. 7, 2013

(51) Int. Cl.
*G11B 5/09* (2006.01)
*G11B 20/18* (2006.01)

(52) U.S. Cl.
CPC ..................... *G11B 20/182* (2013.01)

(58) Field of Classification Search
None
See application file for complete search history.

(56) References Cited

U.S. PATENT DOCUMENTS

| | | | |
|---|---|---|---|
| 7,170,700 B1* | 1/2007 | Lin et al. | 360/31 |
| 8,120,866 B2 | 2/2012 | Che et al. | |
| 2011/0026154 A1* | 2/2011 | Che et al. | 360/31 |

* cited by examiner

*Primary Examiner* — Daniell L Negron
(74) *Attorney, Agent, or Firm* — Kunzler Law Group, PC (57) ABSTRACT

Described herein is a method for testing an electronic information storage device having a read and write head includes writing a plurality of pattern periods along a single track of a magnetic recording medium of the electronic information storage device using the write head. The method also includes mapping read head signals for each pattern period across the single track and surrounding regions of the magnetic recording medium. Additionally, the method includes determining a condition of the electronic information storage device based on an average of the read head signals. The condition can include adjacent track degradation of the magnetic recording medium.

18 Claims, 7 Drawing Sheets

CROSS-TRACK INTERFERENCE TESTING OF A HARD DISK DRIVE

FIELD

This disclosure relates generally to electronic information storage apparatus, and more particularly to testing the cross-track interference of a hard disk drive.

BACKGROUND

Hard disk drives ("HDDs") are widely used to store digital data or electronic information for enterprise data processing systems, computer workstations, portable computing devices, digital audio players, digital video players, and the like. Generally, HDDs store data on a disk with a surface of magnetic material. A transducer head, e.g., read-write head, includes a writing component that magnetically polarizes areas or bits of the magnetic material with one or two polarities to encode either binary zeros or ones. Thus, data is recorded as magnetically encoded areas or bits of magnetic polarity. The direction of the magnetization points in different directions, which can be referred to as a positive state and a negative state. Each bit can store information (generally binary information in the form of either a 1 or a 0) according to the magnetic polarization state of the bit. Typically, bits are arranged along respective radially-adjacent (e.g., concentric) annular tracks of a disk. A single disk can include space for millions of tracks each with millions of bits. A transducer head also includes a reading component that detects the magnetic polarity of each bit or area and generates an electrical signal that approximates the magnetic polarity. The signal is processed to recover the binary data recorded on the magnetic material.

The amount of data that an HDD can store and the cost of storing data is a largely a function of the areal density of the HDD. The areal density is a measure of the bits of data encoded per unit area. For example, areal density may be measured as gigabits of data per square inch ($Gb/in^2$). The HDD typically stores more data as the areal density increases. In addition, the cost per byte of data stored typically decreases as the areal density increases. Therefore, increasing the areal density of a HDD is highly desirable.

The areal density of the HDD is dependent in part on the strength of a magnetic field generated by the write head that polarizes the magnetic material. Generally, a stronger magnetic field concentrated in a smaller area results in higher areal density. Unfortunately, write heads tend to degrade (e.g., unintentionally write to or erase) areas of magnetic material adjacent intended tracks, decreasing areal density and increasing the signal-to-noise ratio of the read head signal. The magnetic polarities of adjacent magnetic material areas are a component of noise. Noise includes background phenomena that are added to the read head signal that are unrelated to the data bit being read. As the areal density increases, the noise increases, which can increases the difficulty of writing data to a magnetic medium and recovering data from the read head signal.

Read-write heads may have defects that increase the tendency of the heads to degrade tracks adjacent intended tracks. Some read-write heads have magnetic insulating shields that act to reduce degradation of adjacent tracks. However, the efficacy of such shields can vary from part-to-part. Additionally, the magnetic insulating shields, or other components of the head, may be defective or have less-than-optimal performance. Degradation of adjacent tracks also varies based on variations in the magnetic properties of the material of the disk, internal stresses of the disk, and other factors.

Because the adjacent track degradation characteristics of HDDs vary from part-to-part, HDDs are tested to ensure that the adjacent track degradation characteristics of the HDD meets minimum standards. Some conventional tests include the asynchronous writing of bit patterns along a single or multiple tracks. Conventional asynchronous track tests include writing a bit pattern in a track and writing different bit patterns in the same or different tracks to detect adjacent track degradation. Some HDD manufacturers employ a single pattern synchronous track test to detect degradation of regions adjacent the synchronous track. Single pattern synchronous track tests include preparing background around a pre-determined location of the disk (e.g., erasing areas or writing regular tracks of information adjacent the pre-determined location) and repeatedly writing a non-alternating bit pattern or single bit pattern along a central part of the prepared area (commonly called an "aggressor" track). The adjacent tracks or surrounding regions of the magnetic medium of the HDD are then read by the read head of the HDD, and a determination of the adjacent track degradation characteristics of the HDD is made based on mapping of the read head signals.

SUMMARY

In view of the foregoing discussion, a need exists for an apparatus, system, and method for testing the adjacent track degradation characteristics of HDDs. The subject matter of the present application has been developed in response to the present state of adjacent track degradation testing art, and in particular, in response to problems and needs in the art that have not yet been fully solved by currently available HDD testing techniques. The most common shortcoming with conventional HDD testing techniques for determining the adjacent track degradation characteristics of the HDD is the extended duration of these HDD tests in view of the desire to test, certify, and distribute compliant HDDs in a timely and efficient manner. Some conventional HDD testing techniques take upwards of 30 minutes or longer. Due to the extended duration of such HDD testing techniques, only a small percentage of manufactured HDDs can be tested before they are distributed. Further, because the source and cause of adjacent track degradation can vary substantially from part to part, a large number of untested HDDs with degradation-causing defects are distributed to end-users.

The present disclosure has been developed to provide an apparatus, system, and method for testing the adjacent track degradation characteristics of an HDD that overcome at least one of the above-discussed shortcomings in the art. For example, in some implementations, described herein are an apparatus, system, and method that tests for adjacent track degradation characteristics of an HDD in a relatively shorter duration of time compared to conventional techniques, while providing at least the same level of precision and accuracy as conventional techniques. In one implementation, an HDD can be tested for adjacent track degradation in under a minute, and in some instances less than 15 seconds. Generally, in some embodiments of the present disclosure, the quicker testing technique for detecting adjacent track degradation in an HDD is facilitated through use of multiple synchronous writes of a plurality of pattern periods along a track as opposed to multiple synchronous writes of a single pattern period. The use of synchronous writing of multiple pattern periods acts to significantly reduce the number of writes to accomplish the same number of stress cycles as conventional techniques, and thus provides at least the same accuracy and precision as conventional techniques.

According to one embodiment, a method for testing an electronic information storage device having a read and write head includes writing a plurality of pattern periods along a single track of a magnetic recording medium of the electronic information storage device using the write head. The method also includes mapping read head signals for each pattern period across the single track and surrounding regions of the magnetic recording medium. Additionally, the method includes determining a condition of the electronic information storage device based on an average of the read head signals. The condition can include adjacent track degradation of the magnetic recording medium.

In some implementations of the method, at least some of the plurality of pattern periods have a first bit pattern and at least some of the plurality of pattern periods have a second bit pattern different than the first bit pattern. The first bit pattern can include alternating magnetic regions at a first frequency, and the second bit pattern can include alternating magnetic regions at a second frequency that is different than the first frequency. Writing the plurality of pattern periods can include writing a plurality of pattern period sets, where each pattern period set includes at least one pattern period with the first bit pattern and at least one pattern period with the second bit pattern. An order of pattern periods for each pattern period set can be the same. At least some of the plurality of pattern periods have a third bit pattern different than the first and second bit patterns. According to certain implementations, each of the plurality of pattern periods has the same bit pattern.

In yet certain implementations of the method, writing the plurality of pattern periods includes synchronously writing a plurality of write cycles of the plurality of pattern periods along the single track. The plurality of write cycles can be at most about 1,000 write cycles. The plurality of pattern periods can be at least about 1,000 bit patterns.

According to certain implementations of the method, mapping includes determining signal noise at a location adjacent each pattern period based on a difference between a read head signal at a location adjacent each pattern period and the average of the read head signals. The condition of the electronic information storage device can then be based on the difference between the read head signal at the location adjacent each pattern period and the average of the read head signals. The condition of the electronic information storage device can be a noise or amplitude of the read head signal being above a threshold.

In some implementations of the method, mapping the read head signals includes developing an image of the magnetic properties of the single track and surrounding regions. The condition can be a location of adjacent track degradation. The condition can be a condition of a component of the read and write head, where the condition of the component of the read and write head is based on the location of adjacent track degradation relative to the single track.

According to yet another embodiment, an apparatus for testing an electronic information storage device includes a track write module, a track read module, and a condition detection module. The track write module is configured to command a write head of the electronic information storage device to write a plurality of pattern periods along a single track of a magnetic recording medium of the electronic information storage device. The track read module is configured to command a read head of the electronic information storage device to read the plurality of pattern periods and surrounding regions of the magnetic recording medium. Further, the track read module generates corresponding read head signals. The apparatus also includes a condition detection module that is configured to determine a condition of the electronic information storage device based on the read head signals.

In some implementations of the apparatus, the plurality of pattern periods includes pattern periods of a first type and pattern periods of a second type. The single track includes a plurality of pattern sets each having at least one pattern period of the first type and at least one pattern period of the second type. According to certain implementations of the apparatus, the condition module is configured to calculate an average read head signal of the read head signals, where the condition of the electronic information storage device is based on the average read head signal.

According to another embodiment, a system for testing an electronic information storage device includes a magnetic recording medium of the electronic information storage device. The magnetic recording medium includes a single track that has a plurality of pattern periods. The system also includes a read head that detects the magnetic state of the plurality of pattern periods and adjacent regions of the magnetic recording medium. Additionally, the system includes a controller that determines a degradation condition of the adjacent regions based on the magnetic state of the plurality of pattern periods and adjacent regions.

Reference throughout this specification to features, advantages, or similar language does not imply that all of the features and advantages that may be realized with the present disclosure should be or are in any single embodiment of the invention. Rather, language referring to the features and advantages is understood to mean that a specific feature, advantage, or characteristic described in connection with an embodiment is included in at least one embodiment of the subject matter disclosed herein. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the subject matter of the present application will be described and explained with additional specificity and detail through the use of the accompanying drawings, in which.

DETAILED DESCRIPTION

Figure 1:
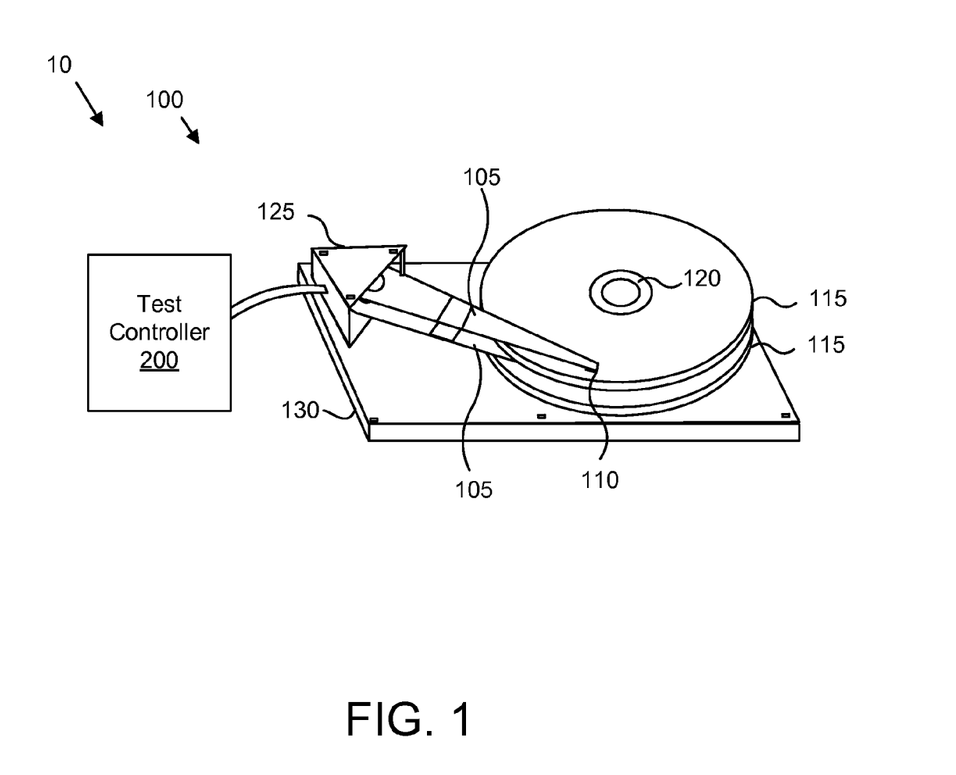
FIG. 1 is a perspective view of a magnetic storage device testing system according to one embodiment.
Figure 2:
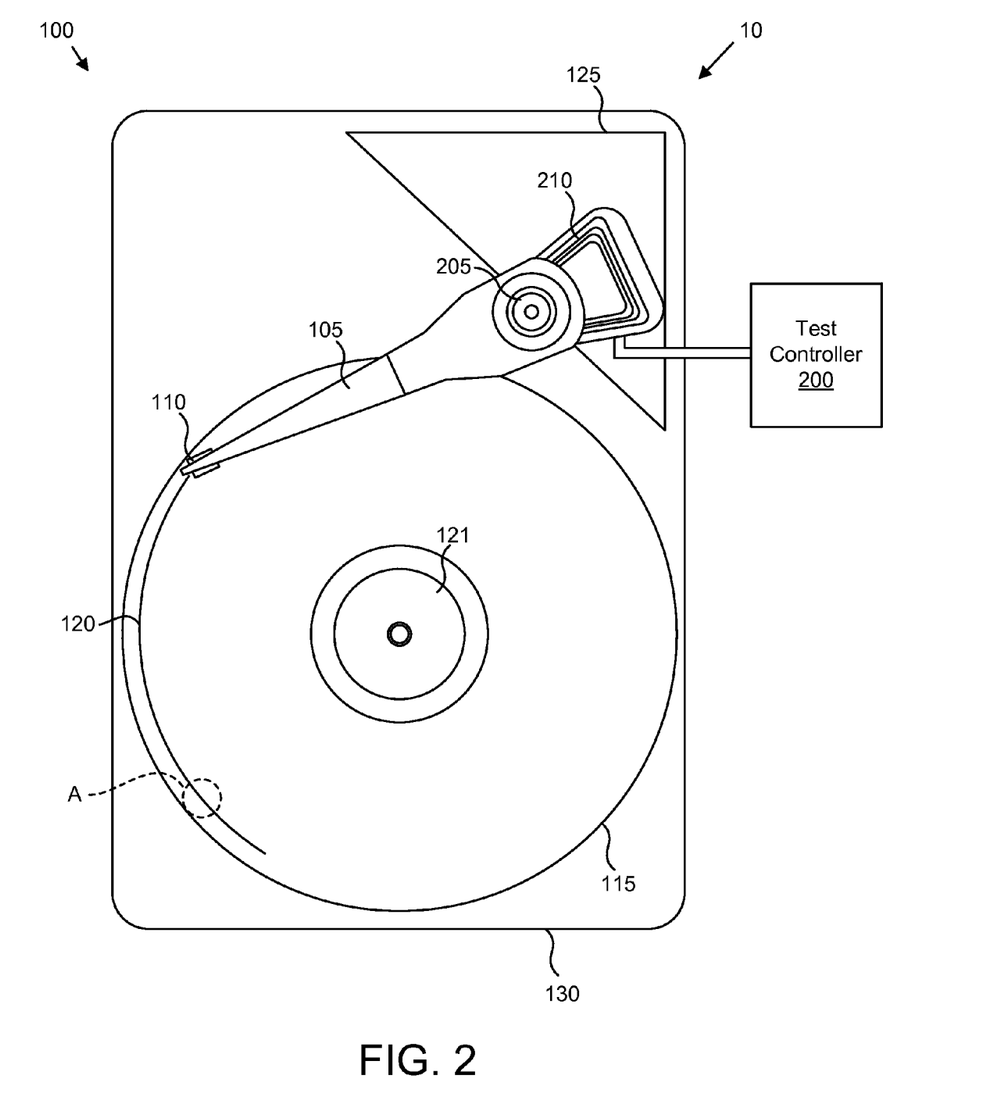
FIG. 2 is a top plan view of a magnetic storage device testing system showing multiple pattern periods being written along a track of a magnetic storage disk of the device according to one embodiment.

FIG. 1 is a perspective view of a system 10 for testing a magnetic storage device 100, according to one embodiment. The depicted magnetic storage device 100 of FIG. 1 is a hard disk drive (HDD). The HDD 100 includes armatures 105, transducer heads, such as transducer head 110, one or more disks 115, a spindle 121, a servo 125, and a base 130. The HDD 100 can also include a cover (shown removed) that couples to the base 130 to form a housing. Each transducer head 110 is secured to an end portion of a respective armature 105 (a second transducer head attached to a lower armature is not shown). Although for simplicity the HDD 100 is described as having two armatures 105, two transducer heads 110, two disks 115, one spindle 121, and one servo 125, any number of armatures, heads, disks, spindles, and servos may be employed.

The spindle 121 is operably connected to the base 130. The disks 115 are operably connected to the spindle 121. The spindle 121 is further configured to rotate the disks 115 a controlled amount and at a controlled rate. Additionally, the spindle 121 may be motivated by a motor as is well known to those skilled in the art. As the disks 115 rotate, the servo 125 positions the armatures 105 and the heads 110 connected to each armature, such that the heads are positioned over a specified radial area of the disks 115.

Each 115 includes a magnetic material (e.g., a magnetic layer made from a magnetic material). In some embodiments, each disk 115 includes magnetic material on both sides of the disk such that data can be stored on both sides of the disk. Further, in these embodiments, the HDD 100 includes transducer heads 110 each positionable over a respective side of each disk. The polarity of the magnetic material may be polarized by a magnetic field to alter the magnetic properties of the disk 115. As is known in the art, each transducer head 110 includes a write component and a read component, which can be disposed collinearly on the head 24.

Generally, and in certain embodiments, the write component of each transducer head 110 receives a write signal that encodes binary digital data and, via a conductive material, creates a magnetic field. In the case of the transducer head 110, the spindle 121 rotates the disk 115 and the servo 125 actuates the armature 105 to cooperatively position the transducer head into a writing position above a designated portion, e.g., the bits of a write track 120, of the disk. The magnetic field polarizes the magnetic material of the bit formed in the disk 115, as is well known to those skilled in the art, to write information to the disk. Similarly, the read component includes a thin film media that senses the magnetic field of a bit of the disk and generates a read signal corresponding to the polarity of the magnetic field as is well known to those skilled in the art. Further, the spindle 121 rotates the disk 115 and the servo 125 actuates the armature 115 in a manner similar to that described above in relation to the write component to position the read component into a read position above a designated portion, e.g., the bits of the write track 120, of the disk.

Figure 4:
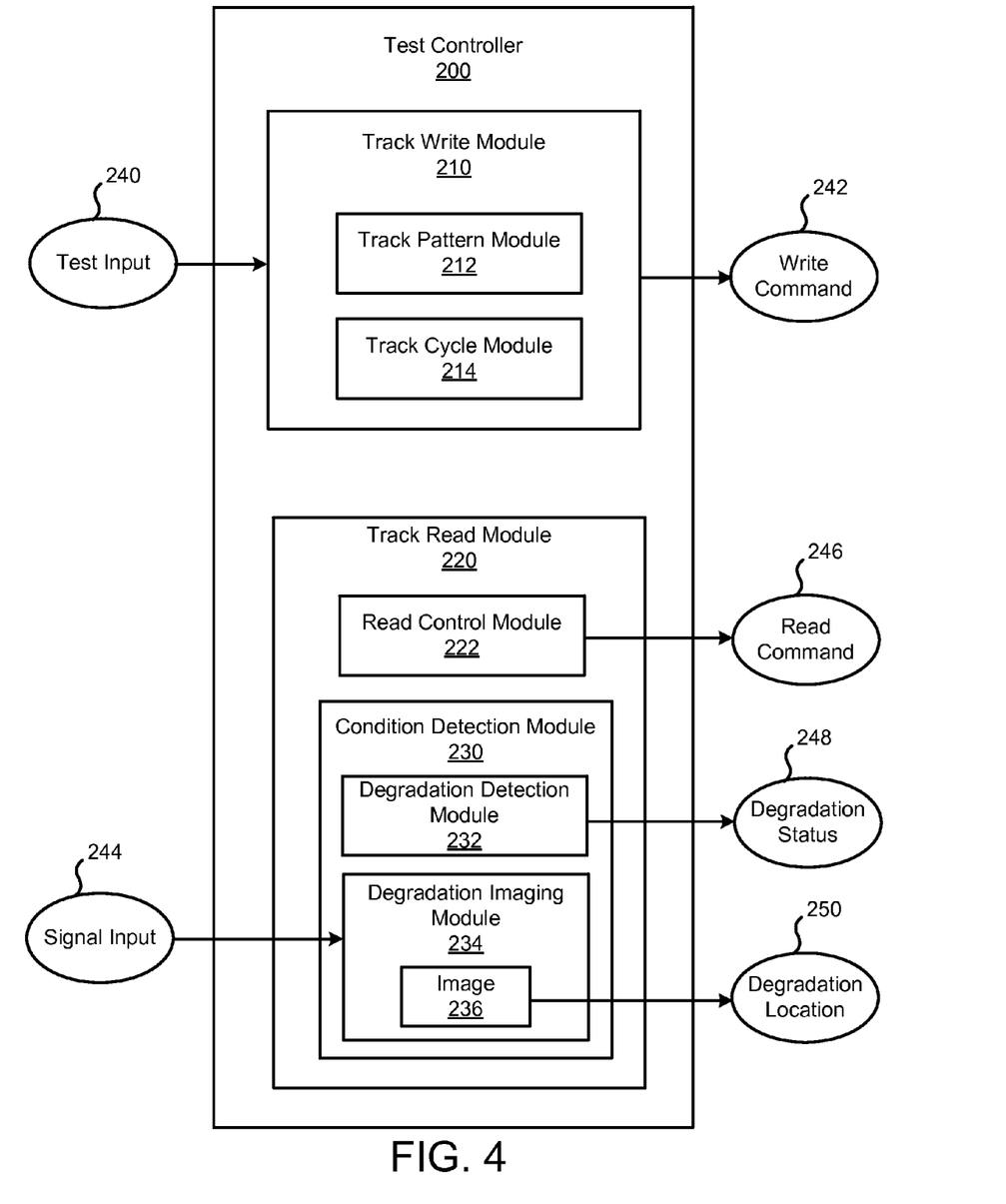
FIG. 4 is a schematic block diagram of a test controller for controlling the testing of an HDD for adjacent track degradation according to one embodiment.

The system 10 also includes a test controller 200 configured to execute a test of the HDD 100. The test controller 200 is coupled in electrical communication with the HDD 100 as shown. In certain implementations, the test controller 200 is electrically coupled to the HDD 100 via a standard data interface known in the art. In some implementations, the test controller 200 can be any of various computing devices known in the art. Referring to FIG. 4, according to one embodiment, the test controller 200 includes a track write module 210, a track read module 220, and a condition detection module 230. Generally, the track write module commands write operations of the HDD 100 according to a testing protocol, the track read module 220 commands read operations of the HDD to obtain read head signals, and the condition detection module 230 determines conditions of the HDD based on the read head signals.

In the illustrated embodiment, the track write module 210 is configured to receive test input 240 and generate a write command 242. The track write module 210 includes a track pattern module 212 and a track cycle module 214. Although the track pattern module 212 and track cycle module 214 are shown as separate modules, they can form part of the same module in some embodiments. The track pattern module 212 is configured to determine the characteristics of multiple pattern periods to be synchronously written along the write track 120 (e.g., an aggressor track) in a magnetic storage medium (e.g., the disk 115) of an electronic information storage device (e.g., the HDD 100). As defined herein, a synchronously-written multi-patterned track is a track formed from multiple synchronous writes of a plurality of divisible bit pattern periods or patterned segments. The characteristics of the pattern periods of the multi-patterned track 120 can include any of various characteristics, such as the total number of bit pattern periods, the number of distinct or different bit pattern periods, the frequency of repeating features of the bit pattern periods, the length of the bit pattern periods, and the like.

In some implementations, the track pattern module 212 determines the characteristics of the pattern periods of the multi-patterned track 120 based on test input 240. The test input 240 can include information regarding the properties and characteristics of the information storage device being tested, as well as other variable and/or preset testing parameters, such as a desired accuracy, precision, or quality of the test. Although any of various test inputs 240 may influence any one or more of the characteristics of the pattern periods of the multi-patterned track 120 in various ways, in some implementations, the track pattern module 212 may determine pattern periods of a multi-patterned track with a higher number of bit pattern periods to achieve test results with a higher accuracy. According to yet some implementations, the track pattern module 212 may determine a multi-patterned track with a higher number of distinct bit pattern periods to achieve test results with a higher accuracy and/or for an HDD where the magnetization properties of the magnetic storage medium or the properties of the read-write head are relatively unpredictable or variable.

Figure 3:
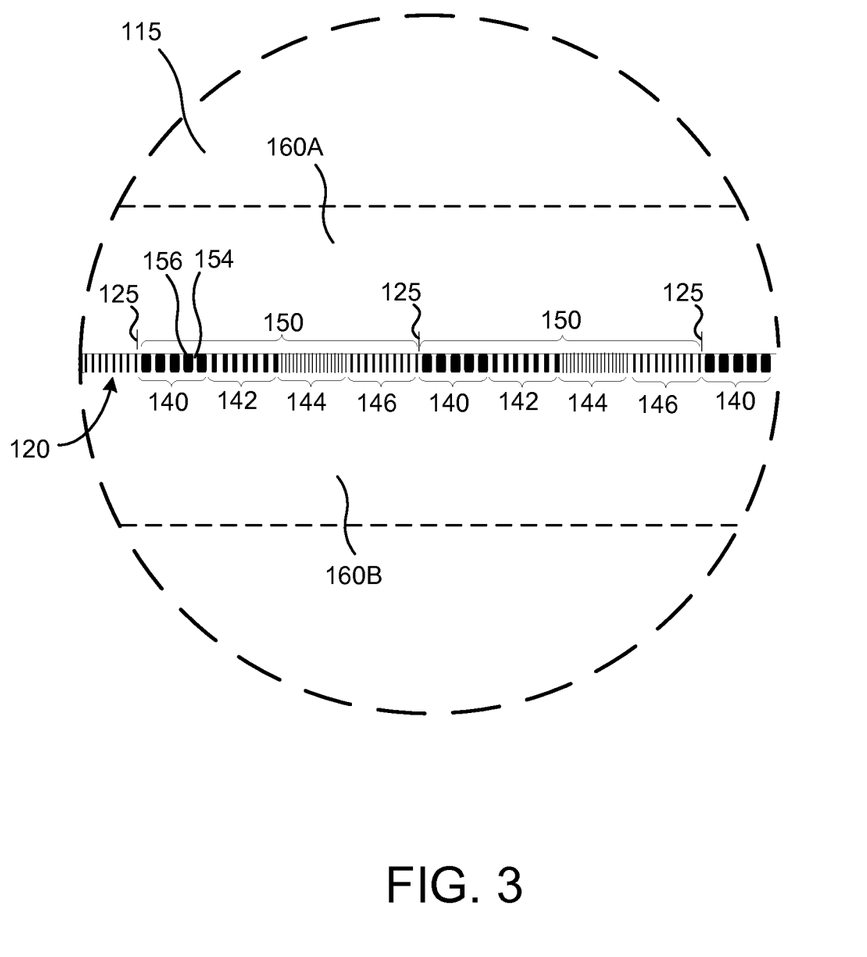
FIG. 3 is a top plan view of a detailed section A of the written pattern periods of the magnetic storage disk of FIG. 2 according to one embodiment.

Referring to FIG. 3, a detailed view of a section of the multi-patterned track 120 written to the disk 115 by a write component of the head 110 is shown. The multi-patterned track 120 includes a plurality of divisible bit pattern periods 140, 142, 144, 146 each defined by a respective bit pattern. Further, the multi-patterned track 120 includes a plurality of bit pattern sets 150 each including one of the divisible bit pattern periods 140, 142, 144, 146. The order of the bit pattern periods 140, 142, 144, 146 for each bit pattern set 150 is the same, which facilitates synchronous writing of the multiple bit pattern periods. Additionally, the location of the beginning 152 of each bit pattern set 150 along the track 120 is known (e.g., based on bit pattern period lengths, number of bit pattern periods in each set, and the length of the track) and can be used to align read head signal data for corresponding bit pattern periods of different bit pattern sets 150 as will be described in more detail below.

As shown, the bit pattern periods 140, 142, 144, 146 of each set 150 have bit patterns that are distinct or different from each other. Bit patterns are distinct when they have different characteristics or when they are different types of patterns. For example, while the bit pattern periods 140, 142, 144, 146 may each have the same length, a frequency of the bit patterns of each distinct period may be different. The frequency of a bit pattern can be defined as the rate at which alternating features 154, 156 of the pattern alternate. Further, the frequency of a bit pattern can be defined in terms of the size of the alternating features 154, 156, such that the larger the alternating features, the lower the frequency, and the smaller the alternating features, the higher the frequency.

Each feature of a bit pattern is one of a first magnetic feature or second magnetic feature, such that the bit pattern alternates between first and second magnetic features 154, 156. The first magnetic features 154 have a first magnetic polarity and the second magnetic features 156 have a second magnetic polarity that is opposite the first magnetic polarity. The longer the bits forming each magnetic and non-magnetic feature 154, 156, the larger (e.g., longer) the feature and the lower the frequency of the alternating features. Accordingly, as shown, the frequency of the bit pattern of the pattern period 140 is lower than the frequencies of the bit patterns of the pattern periods 142, 144, 146, and the frequency of the bit pattern of the pattern period 144 is higher than the frequencies of the bit patterns of the pattern periods 140, 142, 146. Further, the frequency of the bit pattern of the pattern period 142 is lower than the frequency of the bit pattern of the pattern period 146. Although in the illustrated embodiment each bit pattern set 150 includes four pattern periods 140, 142, 144, 146 each with a distinct bit pattern, in other embodiments, the bit pattern sets of a multi-patterned track 120 can include two, three, or more than four pattern periods each with distinct bit patterns.

According to some implementations, each repeating pattern period of a multi-patterned track, such as multi-patterned track 120, can be repeated thousands or tens-of-thousands of times. For example, in one implementation, each repeated pattern period is repeated upwards of between about 20,000 and about 40,000 times per track.

The multi-patterned track 120 of the illustrated embodiment includes a plurality of bit pattern periods with distinct bit patterns grouped into repeating bit pattern sets 150. However, in some embodiments, the multi-patterned track 120 includes only repeating bit pattern periods of the same bit pattern type or having the same characteristics. Accordingly, in such embodiments, the multi-patterned track 120 may appear to have a single continuous pattern. But, for purposes of testing the HDD 100 for various conditions, such as adjacent track degradation (e.g., bit error rate), the apparently single continuous pattern of the multi-patterned track 120 is artificially divided into multiple repeating pattern periods with bit patterns of the same type.

Referring back to FIG. 4, the track cycle module 214 determines the number of times (e.g., write cycles) all the multiple pattern periods are written synchronously into the multi-patterned track 120 of the disk 115. The multiple writes of all the pattern periods of the multi-patterned track 120 define synchronous writes because each write of the pattern periods is the same, and is written over a previous write in the exact same location of the disk 115 (e.g., in the same track of the disk). In other words, each write of the pattern periods is written as an exact copy of the previously written write of the pattern periods in type and location.

Defects or abnormalities in the HDD 100, such as defective or abnormally functioning components (e.g., magnetic shields) of the transducer head 110, may cause the formation of certain undesirable conditions, such as adjacent track degradation, as a track is written into the disk 115. The incremental increase in the undesirable condition caused by the writing of a single period of the pattern is virtually undetectable. However, if the same pattern periods are repeated multiple times over the track, small changes in adjacent disk areas can be detected by aligning multiple pattern periods and calculating average signal. Using this averaging method, small changes that are synchronous with the recorded pattern periods are accumulated, while random media and electronics noise is averaged out. Furthermore, as the multiple pattern periods are written over the same previously written pattern periods, the formation of certain conditions, such as adjacent track degradation, is exacerbated and becomes more detectable. Therefore, the track cycle module 214 is configured to determine a desired number of write cycles necessary to obtain desired test results (e.g., desired accuracy, precision, or quality). Generally, as will be explained in more detail below, the desired number of write cycles is based on the total number of pattern periods, whether distinct or the same, of each write of the multi-patterned track. Accordingly, the accuracy, precision, and quality of an HDD test is dependent on the total number of pattern periods in each write of the multi-patterned synchronous track. For this reason, in some implementations, the number of write cycles determined by the track cycle module 214 is dependent on the number of times each pattern period of a multi-patterned synchronous track should be written to achieve desired test results.

Generally, the number of write cycles necessary to obtain desired test results for multiple synchronous writes of a multi-patterned track 120 of the test system 10 is substantially less than for multiple synchronous writes of a single-patterned track of conventional test systems. As defined herein, a write cycle corresponds with one write of multiple pattern periods into the track 120 of the disk 115, and essentially is associated with one full rotation of the disk 115. In contrast, a stress cycle corresponds with the writing of only one pattern period into the track 120 of the disk 115. For conventional HDD testing techniques where each write to the track includes a single pattern, one stress cycle is equal to one write cycle. Accordingly, with conventional HDD testing techniques, the disk must be rotated a full revolution for each of the stress cycles necessary to achieve desired test results. Typically, one write cycle, or one full rotation of the disk 115, takes a preset amount of time (e.g., between about 4 ms and 8 ms). Therefore, the synchronous writing of a conventional single-patterned track during an HDD testing procedure takes an amount of time equal to the necessary number of stress cycles to achieve the desired test results multiplied by the preset amount of time for each write cycle. As one example, typical HDD testing procedures can require about 100,000 stress cycles to obtain desired test results, which translates into a relatively large amount of write cycles and a correspondingly large amount of time (e.g., between about 10 and about 30 minutes).

In contrast, because each write of a multi-patterned track of the present disclosure includes more than one stress cycle (e.g., on account of having more than one pattern), fewer write cycles are required to achieve the same number of stress cycles and the same desired test results. For example, in one implementation of the present disclosure, only 1,000 write cycles, which takes about 15 seconds, are required to achieve 100,000 stress cycles and the desired rest results. In yet some implementations, only 1 write cycle is necessary, and in other implementations, only between 1 and 1,000 write cycles are necessary. Of course, more than 1,000 write cycles can be used for certain applications as desired. Generally, as will be explained in more detail below, the repeating patterns of a multi-patterned track 120 each count as a separate stress cycle due to an averaging operation of the read head signal characteristics associated with each pattern. The significant time savings associated with the HDD testing technique of the present application allows many more HDDs to be tested in a given time period compared to conventional HDD testing techniques.

According to one embodiment, the measurement time gain of using the present method compared to conventional methods can be calculated. Assuming that N_Periods is the total number of pattern periods in one full revolution or one write cycle of the disk. In some implementations, the maximum number of pattern periods written or recorded during one full disk revolution varies between about 20,000 for 300 bit-long pattern periods and about 30,000-40,000 for 150-bit long pattern periods. Generally, the signal map of one full revolution of the disk of the HDD can be obtained and processed in about one minute, with a half-revolution of the disk (or about 10,000 pattern periods) requiring about 25-30 seconds for obtaining and processing the signal map based on signal averaging. The processing time can be represented by T_Processing.

Assume that the one full revolution of pattern periods is written a number of times represented by N_Writes, where N_Writes is bigger than 1. In some implementations, 100 writes of one full revolution of pattern periods at 10,000 RPM takes about 0.6 seconds, and 1,000 writes of one full revolution of pattern periods at the same RPM about 6 seconds. The total time required for N_Writes can be represented by T_Write. The equivalent number of stress cycles or stress writes then is given by N_Periods*N_Writes.

The total test time for the testing approach of the present disclosure is given by (T_Write+T_Processing). Accordingly, the measured time gain of the proposed method over conventional methods is given by T_Write*(N_Periods/N_Writes)/(T_Write+T_Processing). The gain may vary depending on processing time, but in some implementations, the method of the present disclosure can perform signal mapping in about 30 seconds, which can be about 10-100 times faster than conventional methods.

The track write module 210 generates the write command 242 based on the characteristics of the multi-patterned track 120 as determined by the track pattern module 212 and the number of write cycles of pattern periods to be written synchronously into the track 120 of the disk 115 as determined by the track cycle module 214. The write command 242 includes execution instructions, which when received by the HDD 100, command the HDD to synchronously write the pattern periods having the determined characteristics a number of times corresponding with the desired number of cycles.

After the multiple writes of the multi-patterned track 120 are synchronously written in the disk 115 according to the write command 242, the read control module 222 of the rack read module 220 is configured to generate a read command 246 and transmit the read command to the HDD 100. The read command 246 instructs the HDD 100 to read or detect the magnetic characteristics of the multi-patterned track 120 and surrounding regions 160A, 160B (see, e.g., FIG. 3) using the read component of the transducer head 110. In some implementations, the read component detects the magnetic state of each bit of the multi-patterned track 120, and each bit of unwritten tracks adjacent the multi-patterned track within the regions 160A. The detected magnetic characteristics of the multi-patterned track 120 and surrounding regions 160A, 160B are communicated to the condition detection module 230 of the track read module 220 in the form of signal inputs 244 (e.g., read head signals).

A degradation detection module 232 of the condition detection module 230 utilizes the signal inputs 244 to determine a degradation status 248 of the disk 115. In some embodiments, based on the degradation status 248 of the disk 115, the condition detection module 230 is configured to determine a condition of the HDD 100 and/or components of the HDD, such as the transducer head 110. For example, as shown in the chart 400 of FIG. 6, the degradation detection module 232 utilizes the signal inputs 244 to map the read head signal response in terms of degradation 412 relative to the radial distance away from a centerline 410 of the multi-patterned tracks 120. In some implementations, the degradation 412 is a signal-to-noise ratio (SNR) loss, and the degradation detection module 232 determines an SNR loss at various radial locations away from a designated pattern type of the multi-patterned tracks 120. SNR losses indicate degradation (e.g., adjacent track degradation) of the disk 115. In yet some implementations, the degradation 412 is simply signal noise, which also can provide an indication of degradation of the disk. According to another embodiment, the degradation 412 can be signal amplitude (e.g., normalized signal amplitude), which can provide an indication of the degradation of the disk as the amplitude for a disk without degradation should be zero or near-zero.

Figure 6:
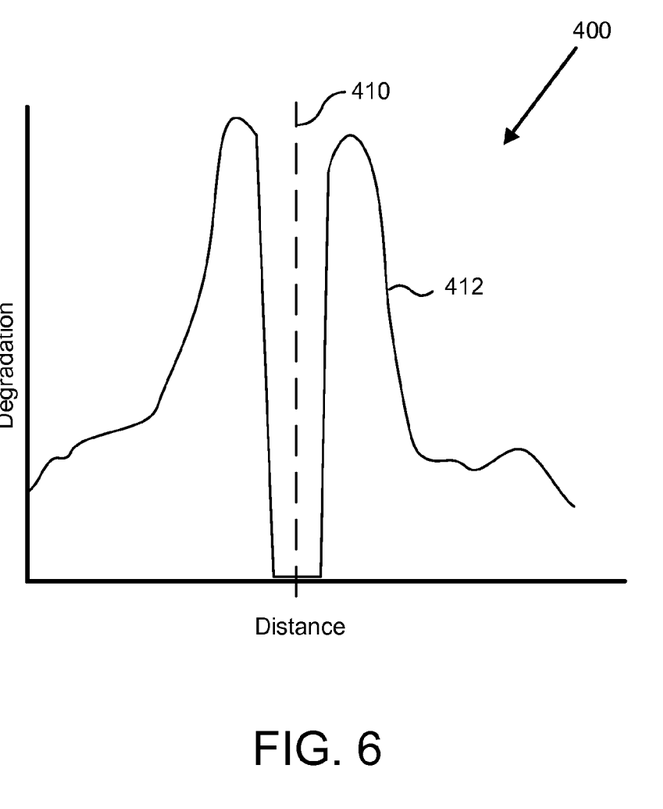
FIG. 6 is a chart showing a comparison between distance away from a synchronously-written multi-patterned track and degradation according to one embodiment.

The chart 400 shows an example of the test results for testing an HDD using one or multiple synchronous writes of a multi-patterned track as discussed above. According to the chart 400, significant degradation is occurring directly adjacent the track 120. The degradation decreases in intensity in radial directions away from the track 120. In some implementations, the degradation status 248 corresponds with the maximum SNR loss, signal noise, or signal amplitude exceeding a corresponding threshold value. For example, if the maximum SNR loss, signal noise, or signal amplitude exceeds a respective threshold value, then the degradation status 248 may indicate a failed HDD. In contrast, if the maximum SNR loss, signal noise, or signal amplitude remains below the respective threshold value, then the degradation status 248 may indicate a passed HDD, or some intermediate status between failed and passed.

In some implementations, the SNR loss at a given location relative to the designated pattern type is based on the difference between the read head signal at the location and the average read head signal at that location for all the patterns of the pattern type. In order to calculate average signal and average noise, the read signal is digitized in multiple cross-track locations. Each digital read signal is aligned in cross-track direction, and pattern periods written along the central track are aligned using signal cross-correlation. Similarly, signal noise and amplitude at a given location relative to the designated pattern type can be based on an average heard head signal at that location for all the pattern periods have the same pattern type. According to one method, indices of a digitized waveform corresponding to the beginning of each pattern period are found. The average signal is then calculated by summation of all pattern periods found within the digitized waveform. For example, if 10,000 pattern repetitions are captured, the resulting signal constitutes an average of the read signals for 10,000 periods. In order to calculate noise distribution, the average signal is subtracted from each raw digitized signal, and the squared value of the above difference is accumulated over each pattern repetition. The resulting distributions constitute cross-track accumulated average signal and noise values.

If the write head generates sufficient magnetization outside of the central track area, small changes of digitized raw signal are expected. However, these changes are below noise level and will not be detected in raw waveform. Due to the above-described averaging process, all random (i.e. non-synchronous with bit pattern) noise fluctuations will be averaged out, thus resulting in average signal and noise values that are synchronous with write head distortions. These distortions can often be detected after only a single write cycle with sufficient time-domain signal and noise averaging. However, the accuracy and effectiveness of single write cycle averaging is limited by the number of pattern periods recorded on a single track, and may not be sufficient for reliable degradation detection. Accordingly, in some implementations, multiple synchronous write cycles are executed. In certain implementations, 1,000 write cycles may be necessary, which takes only about 5-7 s. However, because each write cycle writes many thousand periods, the result of 1,000 write cycles is similar to several million stress cycles (which typically take several hours of continuous disk write operation for conventional testing techniques). Signal and noise degradation are thus amplified by multiple synchronous write cycles and can be reliably detected by combining multiple pattern periods recorded on a track with multiple synchronous write cycles. The level of degradation can be detected using threshold values of acceptable noise deviation from an otherwise uniform value, or by artifact ("ghost") signals recorded outside of the central track.

Because the designated pattern periods repeat along the multi-patterned track in a uniform manner, the locations of each read head signal obtained by the transducer head 110 is known, and can be aligned with the designated pattern periods. In this manner, an average of all the read head signals at the same locations on each pattern period having the same type of bit pattern can be determined. For example, referring to FIG. 3, the average read head signal at a mid-point of the bit pattern period 140 is equal to the average of the read head signals obtained at the mid-point of each of the bit pattern periods 140 along the entire track 120, which in some implementations, can be the average of up to 40,000 read head signals for each of 40,000 bit pattern periods 140.

Figure 7:
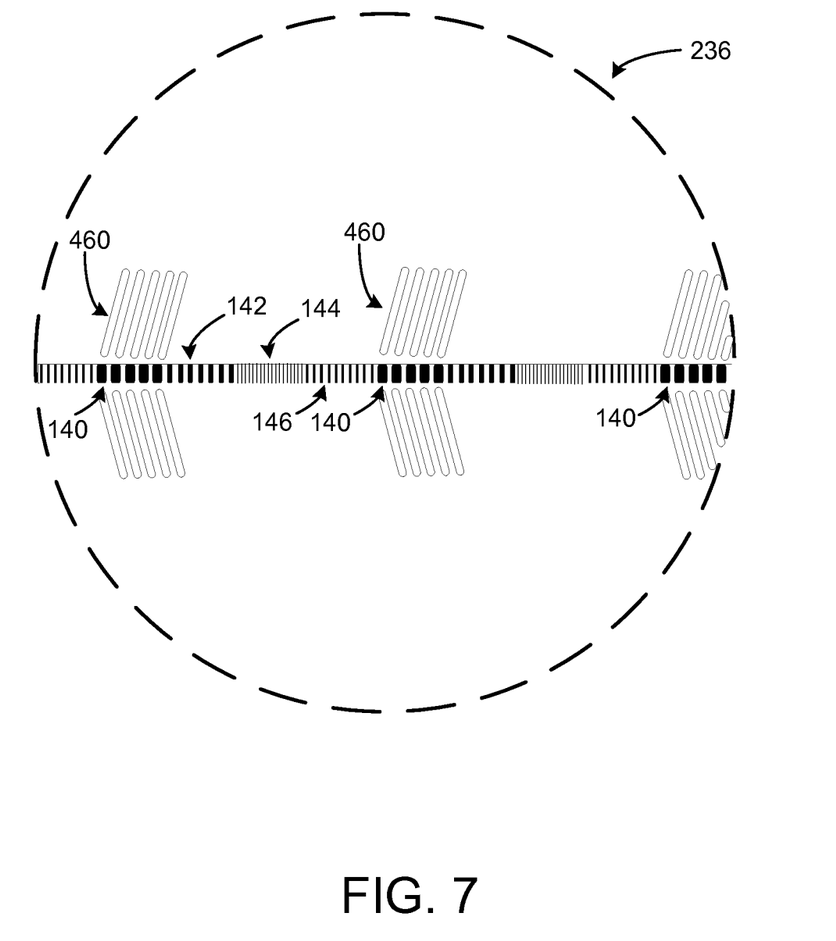
FIG. 7 is a representation of an image developed to show the magnetic properties of a multi-patterned synchronous track and surrounding regions according to one embodiment.

The condition detection module 230 may also include a degradation imaging module 234 that utilizes the signal inputs 244 to develop a mapped image 236 of the magnetic properties of the disk 115. Referring to FIG. 7, one representation of a mapped image 236 is shown. The mapped image 236 corresponds with the detailed section of the magnetic disk 115 of FIG. 3. As shown, after a desired number of multiple pattern period writes are synchronously written to the multi-patterned track 120 according to the write command 242, adjacent track degradation patterns 460 form adjacent corresponding bit pattern periods of the track 120. In the illustrated embodiment, the patterns 460 are formed adjacent each of the bit pattern periods 140 of the tracks 120. Also indicated in the mapped image 236 is the relative absence of degradation patterns adjacent other bit pattern periods 142, 144, 146. Accordingly, based on the mapped image 236, the location of the degradation relative to the bit pattern periods of the tracks 120, as well as which bit patterns are causing the write head of the transducer to impart degradation to the disk, can be determined. The degradation imaging module 234 is configured to generate a degradation location 258, or a bit pattern source of the degradation, based on the mapped image 236.

According to some embodiments, the degradation imaging module 234 is further configured to determine a defect in the HDD 100 based on the mapped image 236. The defect in the HDD 100 determined by the degradation imaging module 234 may be a malfunctioning or defective component of the HDD, such as one or more magnetic shields of the transducer head 110 failing to adequately shield adjacent tracks from the magnetization or demagnetization of an intended track. In some implementations, the defect corresponds with the bit pattern type associated with the degradation patterns shown in the image. For example, in the illustrated embodiment, the degradation patterns 460 being adjacent the bit patterns 140 may suggest a defect in a particular one of the magnetic shields of the transducer head 110. Alternatively, degradation patterns adjacent other bit pattern types, such as bit patterns 142, may suggest a defect in another one of the magnetic shields of the transducer head 110. For this reason, synchronously writing a plurality of repeating pattern periods having different bit patterns may assist in more easily targeting a malfunctioning or defective component of the HDD 100.

Figure 5:
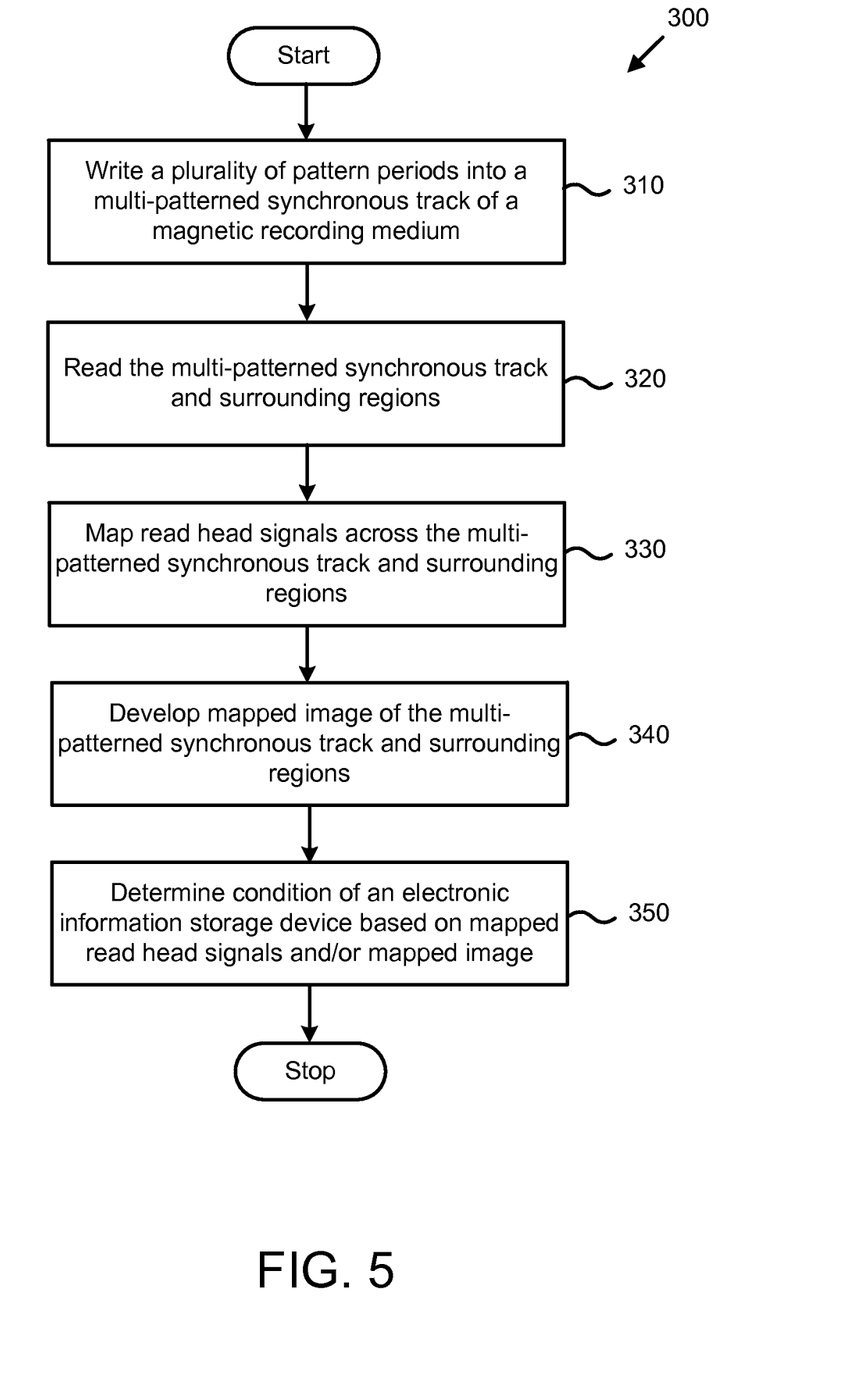
FIG. 5 is a schematic flow chart diagram of one embodiment of a method for testing an HDD for adjacent track degradation.

Referring to FIG. 5, a method 300 for testing an electronic information storage device includes writing a plurality of pattern periods into a multi-patterned synchronous track of a magnetic recording medium at 310. The method 300 also includes reading the multi-patterned synchronous track and surrounding regions at 320. Further, the method 300 maps read head signals from locations on the multi-patterned synchronous track and surrounding regions at 330. Based on the read head signals, the method 300 may develop a mapped image of the multi-patterned synchronous track and surrounding regions at 340. Additionally, the method can determine a condition of the electronic information storage device based on the mapped read head signals and/or mapped image. The actions of the method 300 can be executed by any of various apparatus and systems, including the system 10, including the controller 200, of the present disclosure.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element.

Indirect coupling can be defined as coupling between two elements not in direct contact with each other, but having one or more additional elements between the coupled elements. Also, securing one element to another element can include direct and indirect securing. Additionally, as used herein, "adjacent" does not necessarily denote contact (i.e., one element can be adjacent to another without being in contact with the other).

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

The subject matter of the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method for testing an electronic information storage device having a read and write head, the method comprising:
    writing a plurality of pattern periods along a single track of a magnetic recording medium of the electronic information storage device using the write head, wherein the plurality of pattern periods comprises pattern periods of a first type and pattern periods of a second type, and wherein the single track comprises a plurality of pattern period sets each comprising at least one pattern period of the first type and at least one pattern period of the second type;
    mapping read head signals for each pattern period across the single track and surrounding regions of the magnetic recording medium; and
    determining a condition of the electronic information storage device based on an average of the read head signals;
    wherein writing the plurality of pattern periods comprises synchronously writing a plurality of write cycles of the plurality of pattern periods along the single track.

2. The method of claim 1, wherein the condition comprises adjacent track degradation of the magnetic recording medium.

3. The method of claim 1, wherein the pattern periods of the first type comprise a first bit pattern and the pattern periods of the second type comprise a second bit pattern different than the first bit pattern.

4. The method of claim 3, wherein the first bit pattern comprises alternating magnetic regions at a first frequency, and the second bit pattern comprises alternating magnetic regions at a second frequency that is different than the first frequency.

5. The method of claim 3, wherein each pattern period set comprises at least one pattern period comprising the first bit pattern and at least one pattern period comprising the second bit pattern.

6. The method of claim 5, wherein an order of pattern periods for each pattern period set is the same.

7. The method of claim 3, wherein at least some of the plurality of pattern periods comprise a third bit pattern different than the first and second bit patterns.

8. The method of claim 1, wherein an order of pattern periods for each pattern period set is the same.

9. The method of claim 1, wherein the plurality of write cycles comprises at most about 1,000 write cycles.

10. The method of claim 1, wherein mapping comprises determining signal noise at a location adjacent each pattern period based on a difference between a read head signal at a location adjacent each pattern period and the average of the read head signals, and wherein the condition of the electronic information storage device is based on the difference between the read head signal at the location adjacent each pattern period and the average of the read head signals.

11. The method of claim 1, wherein the plurality of pattern periods comprises at least about 1,000 bit patterns.

12. The method of claim 1, wherein the condition of the electronic information storage device comprises a noise or amplitude of the read head signal being above a threshold.

13. The method of claim 1, wherein mapping read head signals comprises developing an image of the magnetic properties of the single track and surrounding regions.

14. The method of claim 13, wherein the condition comprises a location of adjacent track degradation.

15. The method of claim 14, wherein the condition further comprises a condition of a component of the read and write head, and wherein the condition of the component of the read and write head is based on the location of adjacent track degradation relative to the single track.

16. An apparatus for testing an electronic information storage device, the apparatus comprising:
    a track write module configured to command a write head of the electronic information storage device to write a plurality of pattern periods along a single track of a magnetic recording medium of the electronic information storage device, wherein the plurality of pattern periods comprises pattern periods of a first type and pattern periods of a second type, and wherein the single track comprises a plurality of pattern sets each comprising at least one pattern period of the first type and at least one pattern period of the second type;
    a track read module configured to command a read head of the electronic information storage device to read the plurality of pattern periods and surrounding regions of the magnetic recording medium, and generate corresponding read head signals; and
    a condition detection module configured to determine a condition of the electronic information storage device based on the read head signals.

17. The apparatus of claim 16, wherein the condition module is configured to calculate an average read head signal of the read head signals, and wherein the condition of the electronic information storage device is based on the average read head signal.

18. A system for testing an electronic information storage device, the system comprising:
    a magnetic recording medium of the electronic information storage device, the magnetic recording medium comprising a single track comprising a plurality of pattern periods, wherein the plurality of pattern periods comprises pattern periods of a first type and pattern periods of a second type, and wherein the single track comprises a plurality of pattern sets each comprising at least one pattern period of the first type and at least one pattern period of the second type;
a read head that detects the magnetic state of the plurality of pattern periods and adjacent regions of the magnetic recording medium; and
a controller that determines a degradation condition of the adjacent regions based on the magnetic state of the plurality of pattern periods and adjacent regions.

* * * * *